United States Patent
Spink et al.

(10) Patent No.: US 7,163,023 B2
(45) Date of Patent: Jan. 16, 2007

(54) FUEL VAPOR VENT VALVE FLOAT ASSEMBLY AND METHOD OF MAKING SAME

(75) Inventors: Kenneth M. Spink, Jerome, MI (US); Steven H. Verzyl, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 147 days.

(21) Appl. No.: 10/891,580

(22) Filed: Jul. 15, 2004

(65) Prior Publication Data

US 2006/0011234 A1   Jan. 19, 2006

(51) Int. Cl.
*F16K 24/04* (2006.01)

(52) U.S. Cl. .............. 137/202; 137/15.26; 137/315.08; 137/430

(58) Field of Classification Search ............. 137/15.26, 137/202, 315.08, 430
See application file for complete search history.

(56) References Cited

U.S. PATENT DOCUMENTS

| 4,753,262 | A | | 6/1988 | Bergsma .................... 137/39 |
|---|---|---|---|---|
| 4,886,089 | A | * | 12/1989 | Gabrlik et al. .............. 137/202 |
| 5,139,043 | A | * | 8/1992 | Hyde et al. .................... 137/43 |
| 5,439,023 | A | * | 8/1995 | Horikawa .................... 137/202 |
| 5,590,697 | A | * | 1/1997 | Benjey et al. ................ 141/59 |
| 5,678,590 | A | | 10/1997 | Kasugai et al. |
| 5,950,655 | A | | 9/1999 | Benjey |
| 6,062,276 | A | | 5/2000 | Benjey et al. .............. 141/198 |
| 6,170,510 | B1 | | 1/2001 | King et al. |
| 6,206,657 | B1 | | 3/2001 | Newcomer .................. 417/394 |
| 6,286,539 | B1 | * | 9/2001 | Nishi et al. .................. 137/202 |
| 6,508,263 | B1 | * | 1/2003 | Jahnke et al. ................ 137/202 |
| 6,691,725 | B1 | * | 2/2004 | Zorine .......................... 137/2 |
| 6,863,082 | B1 | * | 3/2005 | McIntosh et al. ........... 137/202 |

FOREIGN PATENT DOCUMENTS

GB          1 275 350 A       5/1972

OTHER PUBLICATIONS

EP Search Report, EP 05 015 196.8 search completed Oct. 31, 2005.

* cited by examiner

*Primary Examiner*—Eric Keasel
*Assistant Examiner*—Craig Price
(74) *Attorney, Agent, or Firm*—Anna M. Shih; Roger A. Johnston

(57) ABSTRACT

A float assembly for a multifunction fuel vapor vent valve with a float having a recess formed in the upper surface of the float with a slot formed in the side of the float and communicating with the recess. A raised surface portion is formed in the bottom of the recess and downwardly extending projections are formed in the slot at the recess. A flexible wafer like valve disk is inserted in the slot and deformed or curled to pass under the projections and over the raised surface and into the recess. When fully received in the recess the disk returns to its flat configuration; and, the downward projections prevent removal without distortion. Radially inwardly projections about the recess retain the disk for limited lost motion in the direction of float movement.

14 Claims, 9 Drawing Sheets

FUEL VAPOR VENT VALVE FLOAT ASSEMBLY AND METHOD OF MAKING SAME

BACKGROUND OF THE INVENTION

The present invention relates to vapor vent valves for fuel tanks and particularly valves of the type that are float operated for controlling flow of fuel vapor from the tank to a storage device such as a canister filled with granulated carbonaceous material.

In providing such float operated vent valves for a motor vehicle fuel tank, it has been desired to provide multiple function valves in a common assembly for attachment to the tank through a single access opening in order to minimize the vapor permeation at the attachment. Such multiple function valves have included a plurality of float operated valves intended to close different sized vent ports at different levels of liquid fuel in the tank during refueling and in response to fuel sloshing in the tank during vehicle operation.

Typically, such multifunctional float operated valves require a substantial range of float, size, movement and buoyancy such that the float housing extends into the fuel tank to a significant degree. Thus, the housing is vulnerable to side loading as might be encountered in vehicle crashes and/or rollover conditions and damage to the housing which would then permit escape of vapor and liquid fuel from the tank into the atmosphere. Accordingly, it has been required to provide a redundancy or backup device for closing off the fuel vent ports in the event of valve damage vehicle collision or rollover.

Heretofore, such redundancy or backup for the float operated vent valves has been in the form of an additional float captured in the main valve body structure in a manner which is not susceptible to side loading in a collision which would result in loss of the float position. However, such backup valves require a high degree of flexibility and resiliency to the valve element for closing the vent port and to effect a complete seal in view of the relatively low mass of the backup float element and the minimal inertial or gravitational force available to close the valve in the event of rollover.

It is known to provide a relatively thin flexible elastomeric disk in the top of a relatively small float for providing backup closing of the vapor vent in the event of vehicle rollover for a multifunctional tank vapor vent valve. However, the attachment and retention of such a thin disk onto the float and requirement that the central portion of the disk remain exposed and resilient for closing the vent port has created problems in attachment of the disk-like member to the float. Accordingly, it has been desired to provide the simple and effective yet low cost way of providing a resilient valve member on a relatively small float for backup or redundant sealing of a vapor vent valve vent port in the event of vehicle rollover. In the manufacture of vehicle fuel tank vent valves of the float operated type, this type valve is often referred to as a "gutless" float valve.

BRIEF SUMMARY OF THE INVENTION

The present invention provides a simple relatively low cost and easy to assemble technique for installing and retaining a relatively thin wafer disk-type flexible valve member onto the upper surface of a fuel tank float in a manner which retains the disk about its periphery and provides for an exposed surface of the disk for closing against a vent port valve seat to prevent escape of vapor or liquid fuel from the tank in the event of a rollover. The wafer valve is inserted into a slot formed in the side of the float which communicates with a recess in the upper end of the float. The recess has portions of the rim thereof extending radially inwardly to prevent axial removal of the valve member from the recess yet permit limited lost motion movement with respect to the recess in the direction of float movement. Downwardly extending tabs adjacent the slot prevent removal of the wafer once inserted into the recess. Curling or deformation of the wafer disk is required to insert the wafer past the downwardly extending projections and into the recess due to a raised surface in the bottom of the recess. Upon insertion, the wafer returns to its normal generally flat configuration and is retained in the recess by the downwardly extending projections.

DETAILED DESCRIPTION OF THE INVENTION

Figure 1:
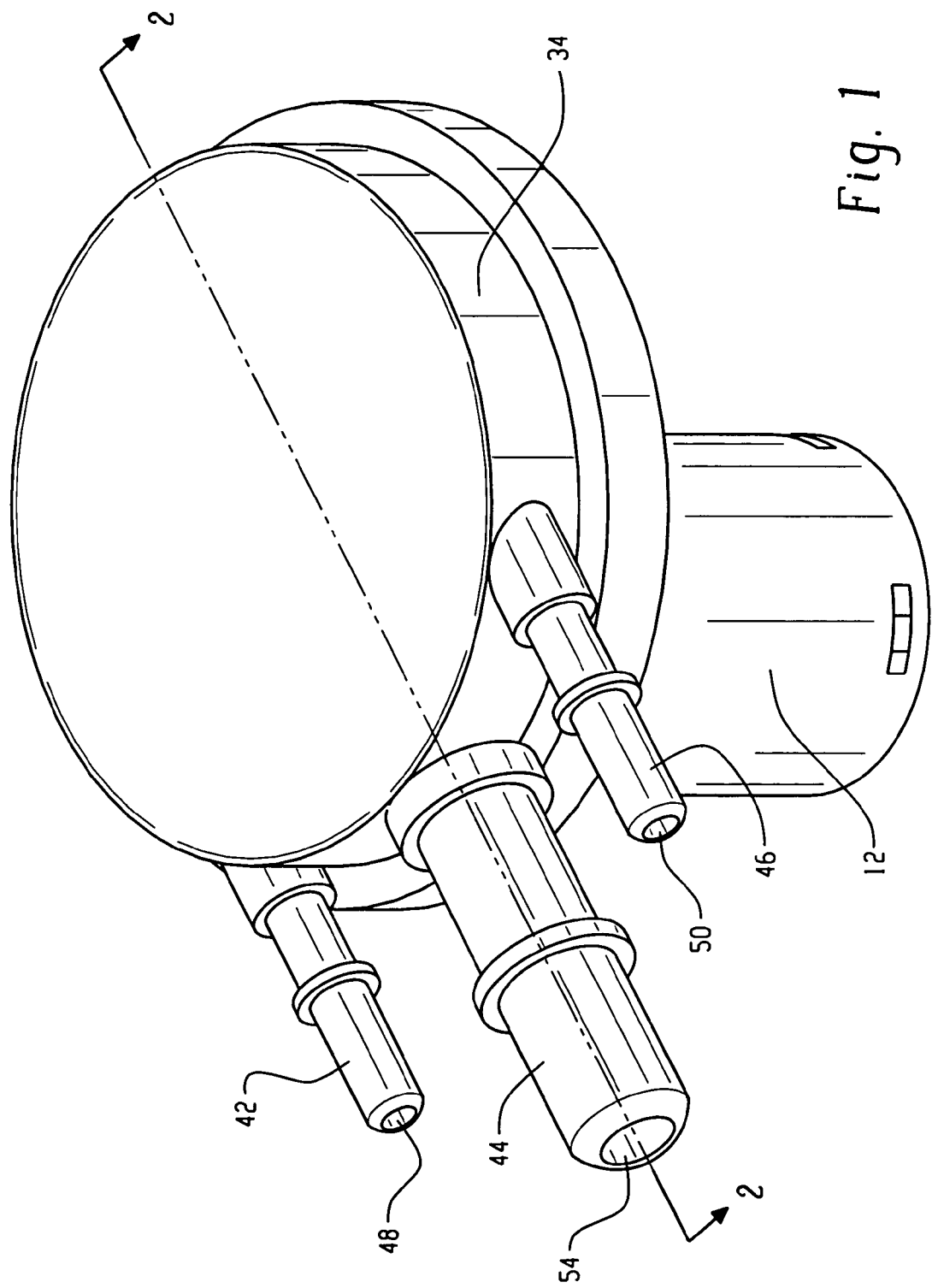
FIG. 1 is a perspective view of the valve assembly employing the present invention.
Figure 2:
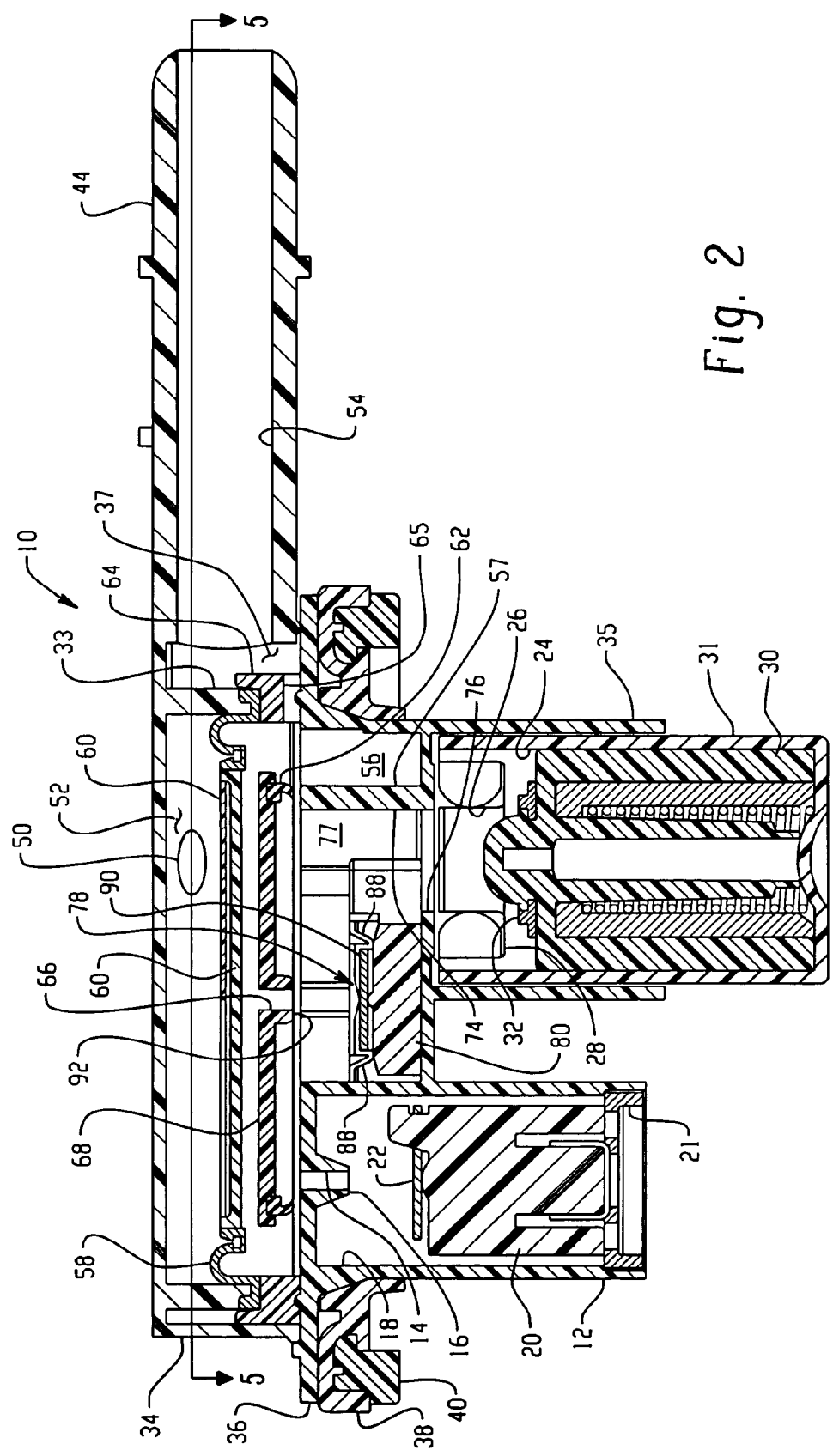
FIG. 2 is a section view taken along section-indicating lines 2—2 of FIG. 1.
Figure 3:
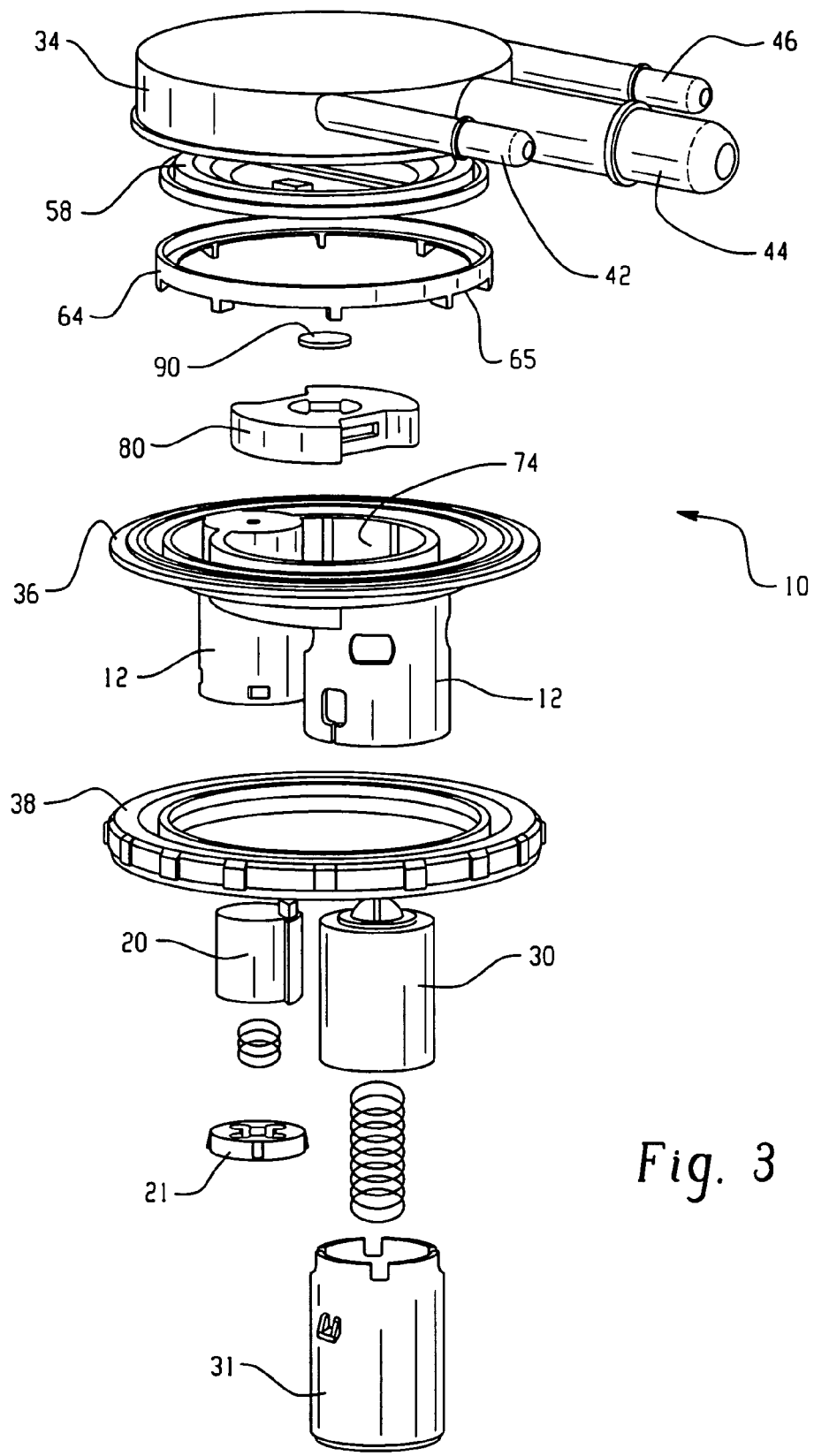
FIG. 3 is an exploded view of the assembly of FIG. 1.

Referring to FIGS. 1 through 3, a multifunction valve assembly indicated generally at 10 and includes a valve body 12 which has formed therein a first vapor vent passage 14 having a valve seat 16 on the end of passage 14. The valve seat 16 is disposed at a first level with respect to the positioning of the valve through an access opening (not shown) through the wall of an unshown fuel tank.

The valve body 12 defines a first float chamber 18 which has disposed therein a float 20 which has a flexible resilient valve member 22 disposed on the upper end of the float for closing port 14 when the valve float rises and valve member 22 seats on valve seat 14.

Valve body 12 further defines a second valving chamber 24 having a second vent passage 26, larger than passage 14, and which has the lower end thereof forming a valve seat 28 which is disposed at a lower level with respect to valve seat 16. A float assembly 30 is slidably disposed in the chamber 24; and, float 30 has a resilient annular valve member 32 disposed on the upper end thereof for closing against valve seat 28 when the float rises to a second level lower than the level required to close vent passage 14 thereby closing vent passage 26.

Referring to FIGS. 2 and 3, float 30 is retained in the body chamber 24 by a cup-shaped member 31 secured into the downwardly extending tubular portion 25 of the body 12.

Float 20 is secured into the downwardly extending tubular portion of body 12 by a retaining cap 21.

Body 12 includes an annular radially outwardly extending flange 36 which has an adaptor ring 38 secured thereto by any suitable expedient such as, for example, weldment which may be accomplished by spin welding or ultrasonic welding or similar process. Ring 38 is overmolded upon an insert ring 40 which is formed of a suitable material adapted for sealing attachment to the outer surface of the fuel tank by weldment.

A cover 34 has formed therewith, preferably integrally, as a one-piece member, a plurality of fluid connector fittings disposed in spaced, preferably parallel, arrangement as denoted by reference numerals 42, 44, 46. In the presently preferred practice the cover 34 is formed of suitable material for attachment to the flange 36 by suitable expedient, as for example, weldment by ultrasonic or spin welding techniques.

Figure 5:
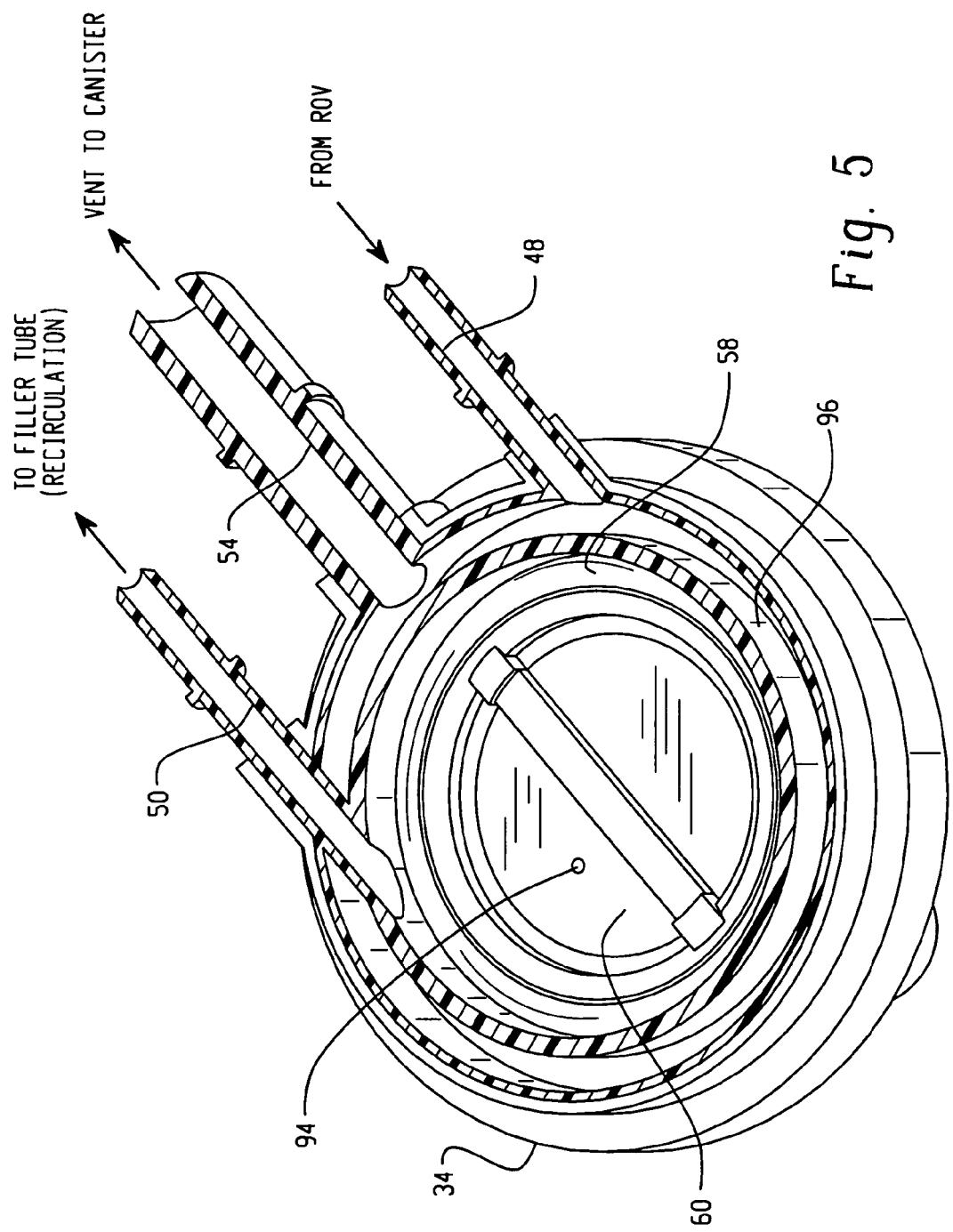
FIG. 5 is a section view taken along section-indicating lines 5—5 of FIG. 2.

Referring to FIGS. 2 and 5, cover 34 has an annular rib 96 extending downwardly therefrom which seals the periphery of diaphragm 58 against annular member 64 which may be provided as an insert welded to flange 36.

In the presently preferred practice annular insert member 64 has the lower surface thereof castellated to provide plurality of cross passages such as passage 65 as shown in FIG. 2 for the purpose of communicating annular chamber 56 with the annular chamber 37 formed in the cap 34 by the annular rib 33. Annular chamber 37 serves as a collector for communicating with passages 50 and 54 and fittings 46 and 44.

The cover 34 has fittings 42, 46 which define respectively passages 48, 50 which communicate with a chamber 52 formed within the cover 34. The fitting 44 has a vent passage 54 formed therein which communicates with an annular groove or channel 56 formed in the valve body. The chamber 52 is closed by a flexible annular diaphragm 58 which has a central rigid center plate or valve member 60 disposed thereon and preferably insert molded therewith. An annular flexible seal 62 is disposed about the undersurface of valve member 60 for sealing about the upper rim of the inner periphery of groove or annular chamber 56. Valve member 60 has a vertically oriented vent passage 66 formed in the central region thereof which communicates with a cross passage 68 which communicates with the annular region formed by undersurface of diaphragm 58, groove 56 and ring 33 attached to the upper surface of flange 8.

The center plate or valve member 60 has a cross passage 68 formed therein which communicates the vent passage 66 with the annular region under the diaphragm 58 surrounding the center plate 66.

A resilient flexible seal 62 is provided on the undersurface of the center plate 60 seals upon the upper surface 70 of the annular rib 57 forming chamber 56; and, the inner periphery 74 of the annular rib 57 forms the sidewall of a third valving chamber 77 which communicates through the aperture 76 formed in the bottom thereof with the vent passage 26.

Figure 4:
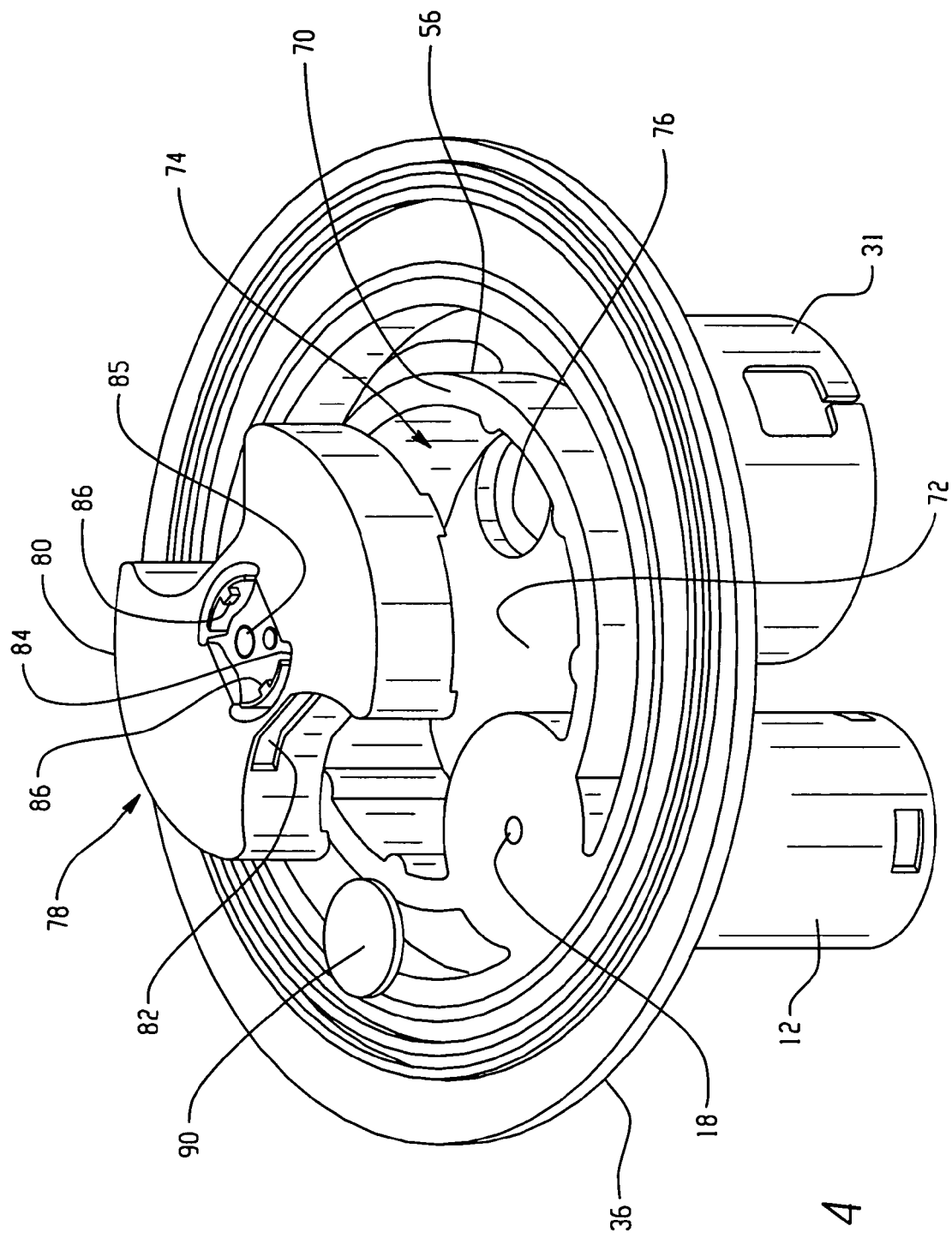
FIG. 4 is a perspective view of the assembly of FIG. 1 with the cover removed.

Chamber 74 has a third float assembly indicated generally at 78 as shown in exploded view in FIG. 4.

The float assembly 78 includes a float body 80 having a slot 82 formed in the side thereof and which extends therethrough to a recess 84 formed in the upper surface of the float body with a plurality of projections 86 disposed on the upper surface of the float body and extending radially inwardly in the recess. At least one downwardly extending projection 88 is formed in the slot 82 at the recess to facilitate retention of a valve member as will hereinafter be described. The bottom of the recess has a raised surface portion 85 shown in FIG. 4.

A resiliently flexible valve member in the form of a disk 90 is inserted through the slot 82 and flexed to permit passage under the downward projections 88 into the recess 84 and over raised surface portion 85. Upon being fully inserted into recess 84, valve disk 90 returns to its flat configuration and is moved to a position by raised surface 85 such that projections 88 prevent removal of the disk 90 without deformation thereof. Projections 86 permit limited lost motion of disk 90 in the direction of float movement.

The float assembly 78 is positioned vertically in the chamber 74 with respect to a valve seat 92 formed on the lower end of the passage 66 in diaphragm center plate 68 such that a valve member 90 is moved upwardly to contact the valve seat 92 and closes vent passage 66 when the fuel level in the tank has risen to a level higher than that required to close vent passage 26 and vent passage 18.

Referring to FIG. 5, a small bleed hole 94 is provided in the center disk 60 to permit limited residual flow therethrough when valve member 90 is closed against valve seat 92.

Figure 6:
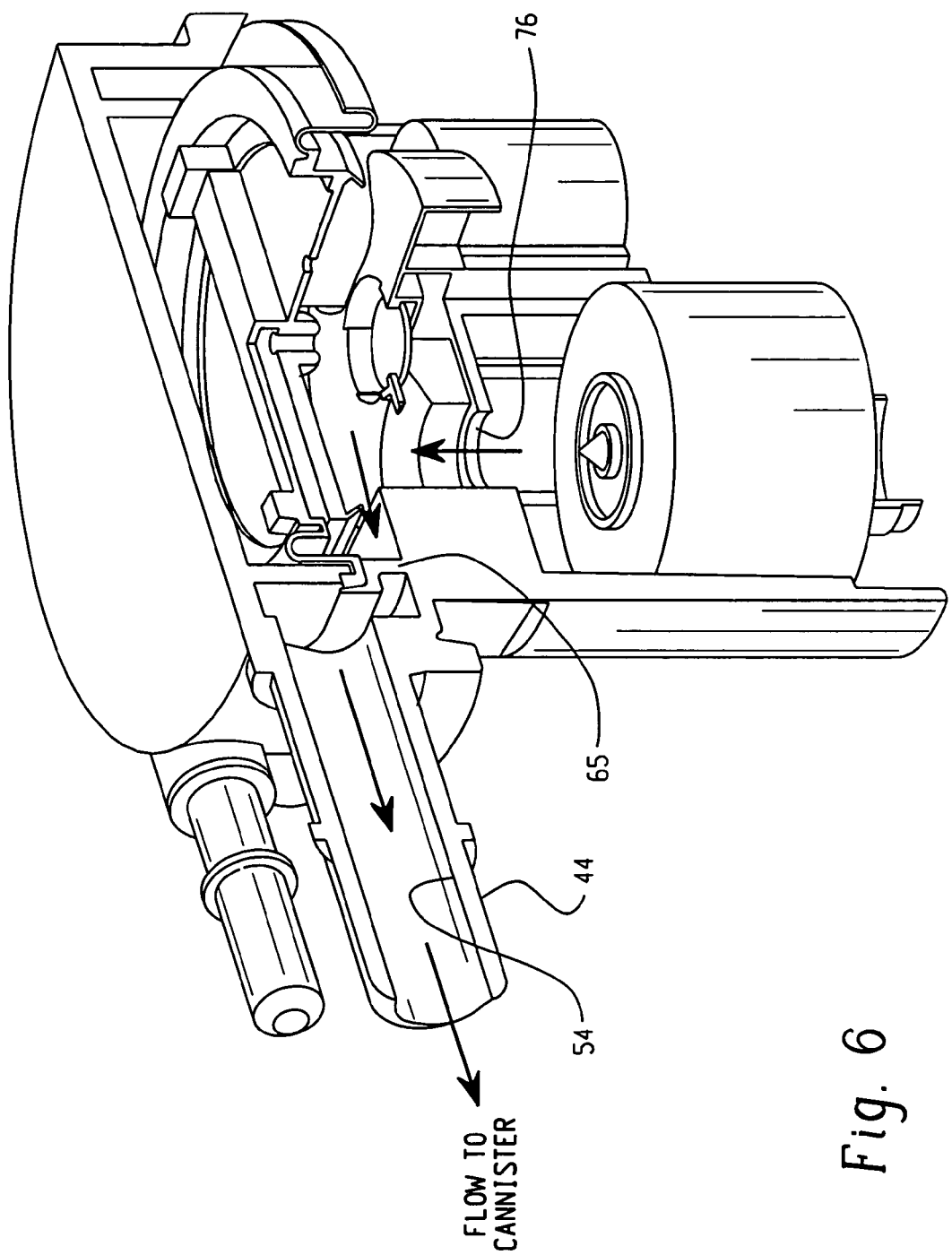
FIG. 6 is a perspective view of the assembly of FIG. 1 broken away to show the position of the float operated valves during refueling.

Referring to FIG. 6, the valve is shown in the operating mode during refueling in which the large vent passage 76, 26 permits vapor flow to the region under the diaphragm through cross passages 65 and through vent passage 54 in fitting 44 which is adapted for connection to a storage canister (not shown).

Figure 7:
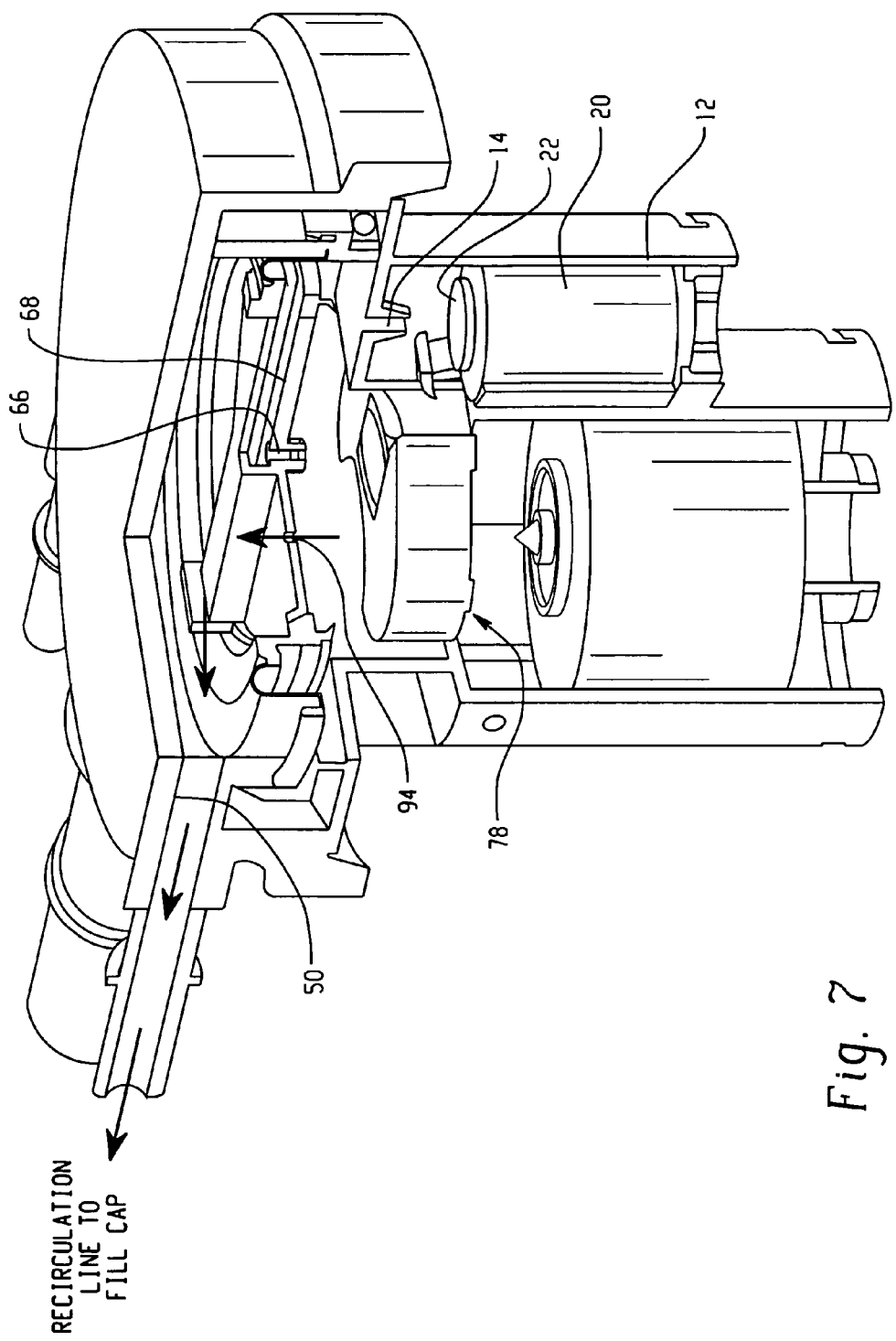
FIG. 7 is a view similar to FIG. 6 showing the vapor recirculation flow indicated with black arrows.

Referring to FIG. 7, vapor flows through bleed holes 94 and the diaphragm center plate to the region 52 above the diaphragm and outwardly through passage 50 in fitting 46 which is adapted for connection to the recirculation line to the upper end of a tank filler tube (not shown).

Figure 8:
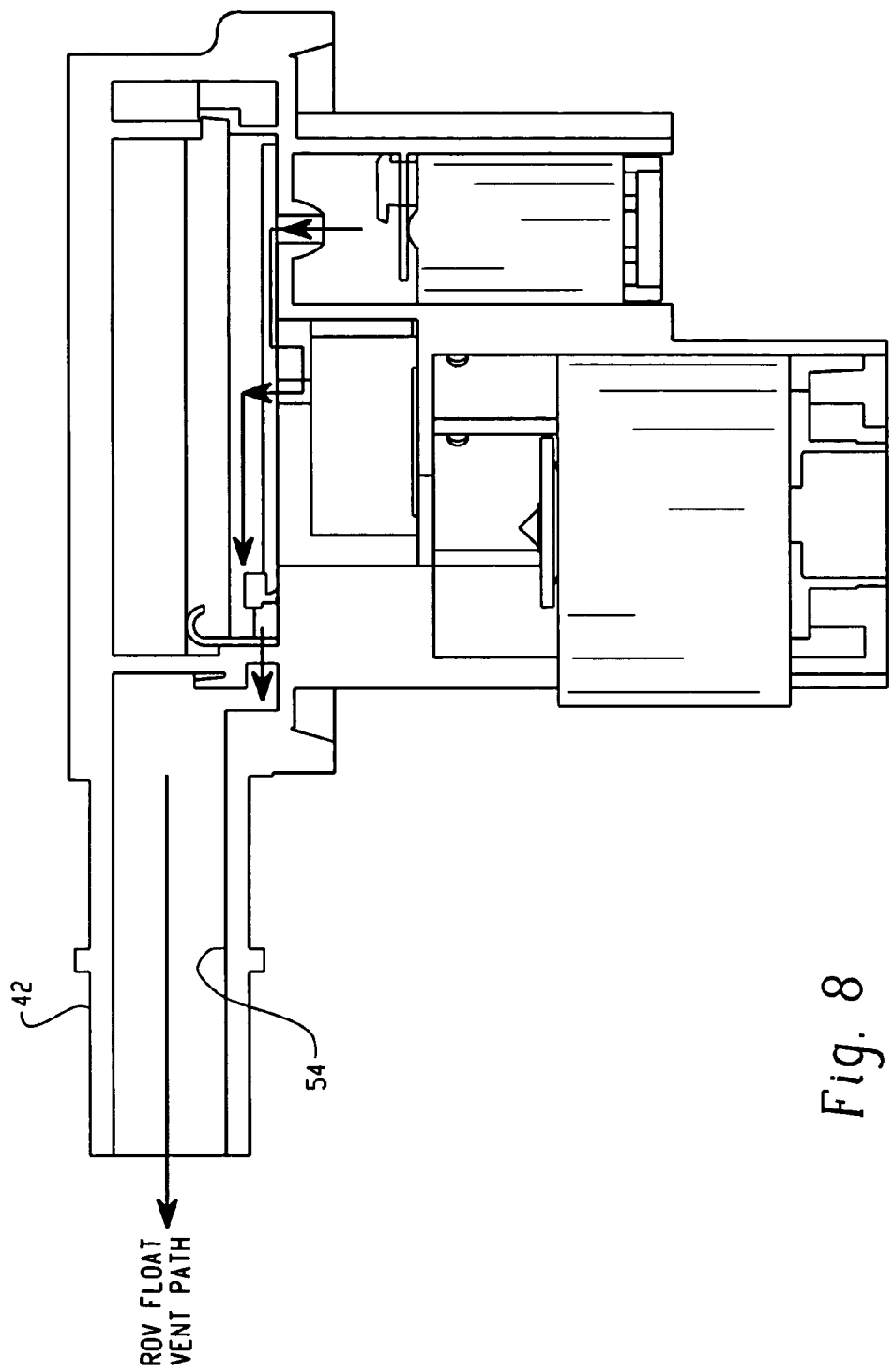
FIG. 8 is a view similar to FIG. 6 showing the vapor flow through the smaller float operated valve during engine operation; and, FIG. 9 is a view similar to FIG. 6 showing the vapor flow through the large vent passage during engine operation.

Referring to FIG. 8, a valve is shown with float 20 lowered to permit flow through vent passage 14 to the undersurface of the diaphragm. With seal 62 in a downward or closed position and with float assembly 78 lowered, flow passes through vent passage 66 in the diaphragm plate and cross passage 68 to the outer annular region surrounding the seal 62 and outwardly through cross passages 65 for communication with passage 48 in fitting 42 adapted for communication with a rollover valve (ROV) (not shown).

Figure 9:
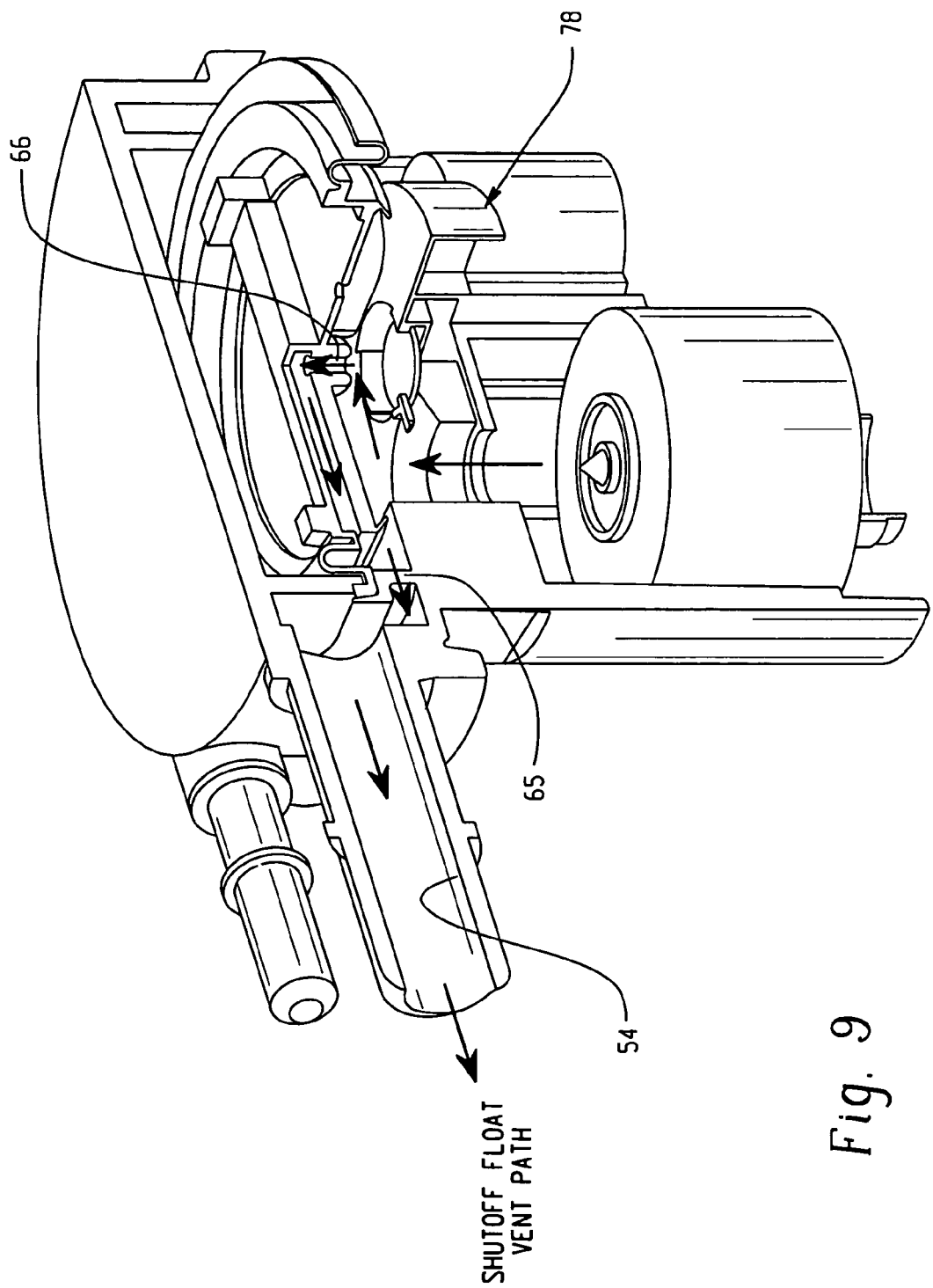

Referring to FIG. 9, the float assembly 78 is shown in the downward position to permit vapor flow through the vent passage 66 and the diaphragm center plate and cross passage 68 and cross passages 65 for communication with the passage 54 adapted for connection to an unshown canister.

The present invention thus provides a multifunction fuel vapor vent valve of the type having a plurality of floats for closing different size vent passages as the fuel level rises in the tank during refueling. The present invention provides a float assembly for closing the vent passages when the fuel reaches the desired fill level and incorporates a float body having a slot with a flexible, relatively thin, disk-shaped valve member inserted in the slot into a recess exposing the upper surface of the valve member. The valve member is flexed during insertion to pass over downwardly extending projections and a raised surface portion in the recess which retain the disk in the recess as the disk returns to its unflexed condition in the recess. Radially inwardly extending projections retain the disk in the recess for limited lost motion in the direction of float movement.

Although the invention has hereinabove been described with respect to the illustrated embodiments, it will be understood that the invention is capable of modification and variation and is limited only by the following claims.

What is claimed is:

1. A float operated fuel vapor vent valve comprising:
   (a) a float having an upper surface with a recess formed in said upper surface with portions thereof extending inwardly from the periphery of the recess;
   (b) an elongate slot formed in a side surface of said float without intersecting the upper surface or a lower surface of the float, and the slot communicating with said recess;
   (c) a flat, flexible, discrete valve member disposed in said recess; and,
   (d) structure operable to position said valve in said recess and for retaining said valve therein for limited lost motion with respect to said float in the direction of movement of the float.

2. The assembly defined in claim 1, wherein said inwardly extending portions comprise a plurality of radially inwardly extending projections.

3. The assembly defined in claim 1, wherein said valve member has a relatively thin disk-shaped configuration.

4. The assembly defined in claim 1, wherein said valve member is formed of elastomeric material.

5. The assembly defined in claim 1, wherein said float includes a downwardly extending projection operative to retain said valve member in said recess upon insertion through said slot into said recess.

6. The assembly defined in claim 1, wherein said float has a guide surface formed in a side thereof and adapted for engaging corresponding surfaces on a valve body for guiding movement thereof.

7. The assembly defined in claim 1, wherein said structure operable for positioning said insert in said recess includes at least one downwardly extending projection in said slot.

8. The assembly defined in claim 1, wherein said structure for positioning includes a raised portion formed in the bottom of said recess.

9. A method of making a float assembly for a fuel vapor vent valve comprising:
   (a) forming a float body having an upper surface with a recess formed therein and extending at least a portion of the periphery of the recess inwardly therefrom;
   (b) forming an elongated slot in a side of the float body without intersecting the slot with the upper surface or a lower surface of the float body and communicating the slot with the recess;
   (c) inserting a flexible, flat, discrete valve member in the slot and positioning the flexible valve member in the recess and retaining the flexible valve member in the recess for limited lost motion of the valve member in the direction of float movement.

10. The method defined in claim 9, wherein said step of retaining includes forming at least one downwardly extending projection.

11. The method defined in claim 9, wherein said step of forming a float body includes forming an inwardly extending projection in said recess and biasing said flexible valve member in an upward direction toward said inwardly extending projection.

12. The method defined in claim 9, wherein said step of inserting a flexible valve member includes forming a valve member of elastomeric material.

13. The method defined in claim 9, wherein said step of forming a float body includes forming at least one guide surface on a side of the body adapted for sliding engagement with a corresponding surface on a valve body.

14. The method defined in claim 9, wherein said step of forming a float body includes forming a plurality of pockets on the undersurface.

* * * * *